United States Patent
Hamada

(10) Patent No.: US 11,108,931 B2
(45) Date of Patent: Aug. 31, 2021

(54) INFORMATION PROCESSING APPARATUS FOR RETRANSFERRING FAX DOCUMENTS THAT WERE UNSUCCESSFULLY TRANSMITTED

(71) Applicant: FUJI XEROX CO., LTD., Tokyo (JP)

(72) Inventor: Makoto Hamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/654,120

(22) Filed: Oct. 16, 2019

(65) Prior Publication Data

US 2020/0389568 A1 Dec. 10, 2020

(30) Foreign Application Priority Data

Jun. 5, 2019 (JP) .............................. JP2019-105239

(51) Int. Cl.
*H04N 1/00* (2006.01)
*H04N 1/32* (2006.01)
*H04N 1/44* (2006.01)

(52) U.S. Cl.
CPC ......... *H04N 1/32368* (2013.01); *H04N 1/444* (2013.01)

(58) Field of Classification Search
CPC ....................... H04N 1/32368; H04N 1/32374
See application file for complete search history.

(56) References Cited

U.S. PATENT DOCUMENTS

| | | | | |
|---|---|---|---|---|
| 5,729,708 A * | 3/1998 | Satoh | ........................ | G06F 3/12 710/52 |
| 6,307,646 B1 * | 10/2001 | Otsuka | .................. | H04M 1/652 358/400 |
| 6,388,687 B1 * | 5/2002 | Brackett | ............ | H04N 1/00416 709/201 |
| 2005/0063005 A1 * | 3/2005 | Phillips | .............. | H04N 1/32529 358/1.15 |
| 2006/0072144 A1 * | 4/2006 | Dowling | .............. | H04N 1/4486 358/1.15 |
| 2008/0030774 A1 * | 2/2008 | Webster | .................. | G06F 3/126 358/1.15 |
| 2010/0039661 A1 * | 2/2010 | Stephenson | ........ | H04N 1/32641 358/1.15 |
| 2011/0312380 A1 * | 12/2011 | Bard | .................. | H04N 1/00307 455/557 |
| 2015/0103383 A1 * | 4/2015 | Dowling | ............ | H04N 1/00225 358/402 |
| 2017/0279980 A1 * | 9/2017 | Sato | ...................... | G06F 3/1203 |
| 2020/0177741 A1 * | 6/2020 | Hamada | ............. | H04N 1/00214 |

FOREIGN PATENT DOCUMENTS

JP 2005-44345 A 2/2005

* cited by examiner

*Primary Examiner* — Benjamin O Dulaney
(74) *Attorney, Agent, or Firm* — Oliff PLC

(57) ABSTRACT

An information processing apparatus includes a management unit that deletes from a first region a fax document that has been successfully transferred to a predetermined transmission destination and moves from the first region to a second region a fax document that has been unsuccessfully transferred to a transmission destination. A user is not permitted to perform an operation on the fax document stored in the first region and the user is permitted to perform an operation on the fax document stored in the second region.

18 Claims, 12 Drawing Sheets

FIG. 12

| CONDITION TO MOVE | CONTENTS |
|---|---|
| CONDITION 1 | CAUSE FOR TRANSFER FAILURE IS NETWORK FAULT |
| CONDITION 2 | PRE-REGISTERED SOURCE OR SPECIFIC TRANSMISSION DESTINATION |
| CONDITION 3 | PREDETERMINED TERM IS FOUND IN FAX DOCUMENT |
| CONDITION 4 | AMOUNT OF DATA OF FAX DOCUMENT IS EQUAL TO OR BELOW PREDETERMINED SIZE |
| CONDITION 5 | PREDETERMINED TIME PERIOD |
| CONDITION 6 | OWNER OF FAX DOCUMENT IS SPECIFIC PRE-REGISTERED USER |
| ... | ... |

INFORMATION PROCESSING APPARATUS FOR RETRANSFERRING FAX DOCUMENTS THAT WERE UNSUCCESSFULLY TRANSMITTED

CROSS-REFERENCE TO RELATED APPLICATIONS

This application is based on and claims priority under 35 USC 119 from Japanese Patent Application No. 2019-105239 filed Jun. 5, 2019.

BACKGROUND

(i) Technical Field

The present disclosure relates to an information processing apparatus and a non-transitory computer readable medium.

(ii) Related Art

Some facsimile (fax) devices have a function of transferring a received fax document to a predetermined forwarding destination without printing the fax document. This function is referred to as a paperless fax function. The forwarding destination may be a folder in a server or computer connected to the fax device via a network or a specific mail address. With this function, a user may view the fax document transferred on a computer terminal and may print selectively part of the fax document. Since the user is fee from printing all the fax document, print costs may be reduced. The function may be used to back up the fax data transmitted or received by the fax device.

If a network that transfers the fax document malfunctions, a transfer failure of the fax document may be induced. In such a case, the fax document is not saved at the server serving as a forwarding destination. Since a mail having the fax document attached thereto fails to reach a specific mail address, the reception of the fax document goes unnoticed by the user. While the fax document remains unstored at the forwarding destination, the fax document itself may be deleted from the fax device.

Some techniques are disclosed that allow a fax document to be automatically printed if the transfer of the fax document fails.

Japanese Unexamined Patent Application Publication No. 2005-44345 discloses such a related art technique.

If the fax document that has been unsuccessfully transmitted is automatically printed, the printed fax document may be left in a discharge tray. As a result, the fax document may be exposed to persons other than the destination, this leading to a security problem. A technique available to address this security problem is to limit users who have an access to the fax document. For example, a person who has the access right to the fax document may be limited to an administrator of a system.

Only the transmission and reception log may be checked in a region where a transmitted or received fax document is temporarily stored and the fax document stored remains inaccessible for operation. Specifically, even the administrator is not allowed to print or retransfer the fax document that has been unsuccessfully transferred.

SUMMARY

Aspects of non-limiting embodiments of the present disclosure relate to allowing a user to perform an operation on a fax document unsuccessfully transferred to a predetermined transmission destination wherein the fax document is stored in a region which the user is not permitted to perform the operation on.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a management unit that deletes from a first region a fax document that has been successfully transferred to a predetermined transmission destination and moves from the first region to a second region a fax document that has been unsuccessfully transferred to a transmission destination. A user is not permitted to perform an operation on the fax document stored in the first region and the user is permitted to perform an operation on the fax document stored in the second region.

BRIEF DESCRIPTION OF THE DRAWINGS

Exemplary embodiments of the present disclosure will be described in detail based on the following figures, wherein:

FIGS. 4A and 4B illustrate transfer of the fax document wherein FIG. 4A illustrates the transfer of a fax document that is transmitted or received, FIG. 4B illustrates a successful fax transfer.

FIGS. 8A and 8B illustrate the re-transfer of the fax document wherein FIG. 8A illustrates the fax document that is re-transferred from the re-transfer box and FIG. 8B illustrates a successful re-transfer;

FIGS. 9A and 9B illustrate an operation example in which a file name is different from transfer to re-transfer given the same transfer target wherein FIG. 9A illustrates the case in which the fax document is transferred from the fax transmit and receive box and FIG. 9B illustrates the case in which the fax document is transferred from the fax re-transfer box;

FIGS. 10A and 10B illustrate an operation example in which a storage region used is different given the same transfer target wherein FIG. 10A illustrates the case in which the fax document is transferred from the fax transmit and receive box and FIG. 10B illustrates the case in which the fax document is transmitted from the fax re-transfer box;

FIG. 12 illustrates an example of movement conditions.

DETAILED DESCRIPTION

Exemplary embodiments of the disclosure are described with reference to the drawings.

First Exemplary Embodiment

Figure 1:
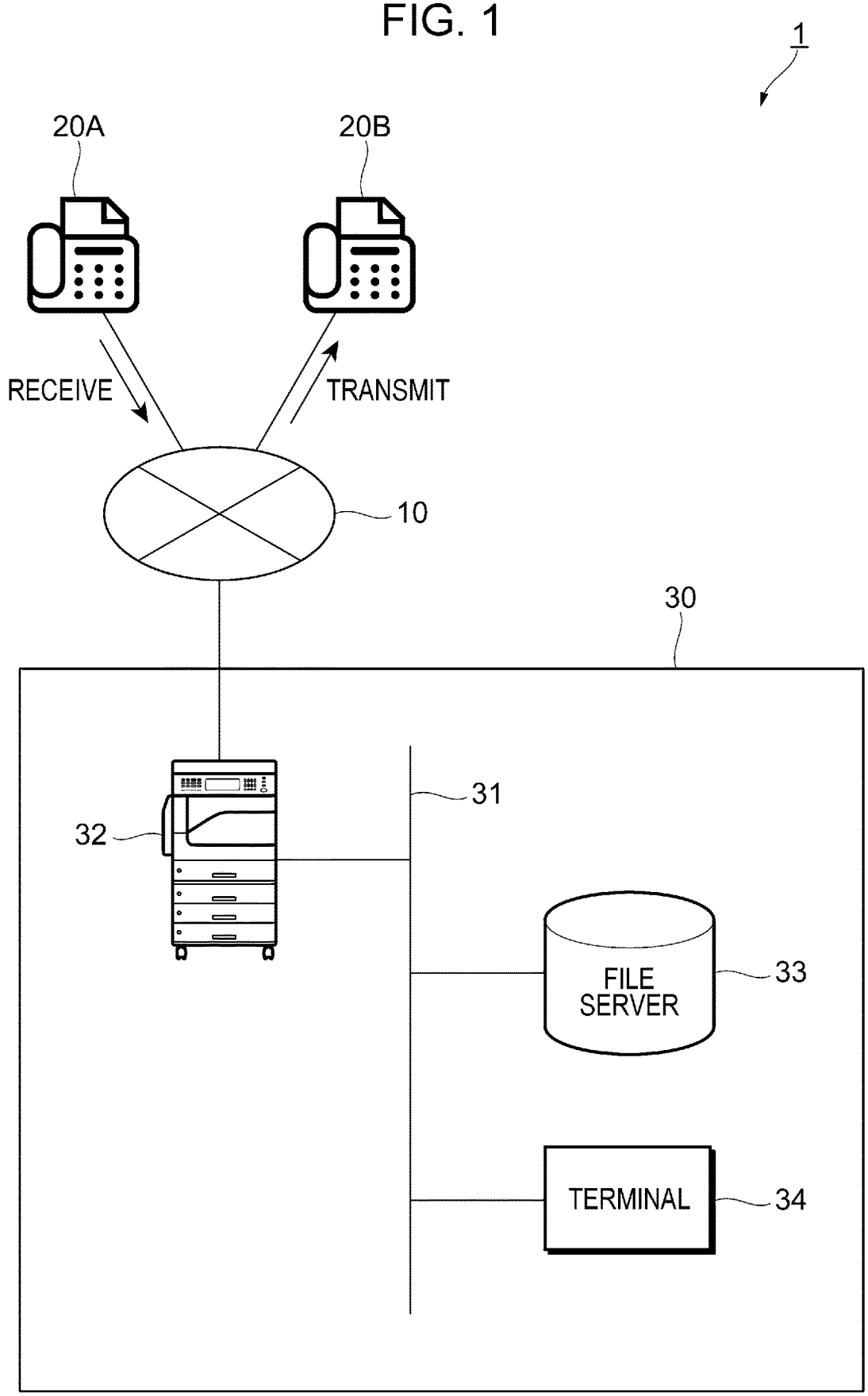
FIG. 1 illustrates the configuration of an information processing system of a first exemplary embodiment of the disclosure.

FIG. 1 illustrates the configuration of an information processing system 1 of a first exemplary embodiment of the disclosure. The information processing system 1 in FIG. 1 includes a public network 10, facsimile (fax) devices 20A and 20B, and provider system 30.

Referring to FIG. 1, the fax device 20A is a sender of a fax document to the provider system 30 and the fax device 20B is a destination of the fax document transmitted by the provider system 30. Devices having a fax function connected to the provider system 30 via the public network 10 is not limited to the fax devices 20A and 20B.

The provider system 30 includes a local-area network 31, image forming apparatus 32 having a fax function, file server 33 used as a transmission destination of the fax document that the image forming apparatus 32 has transmitted or received, and terminal 34 operated by an administrator or a user. Although the single image forming apparatus 32 and the single terminal 34 are illustrated in FIG. 1, multiple image forming apparatuses 32 and multiple terminals 34 may be used instead. In accordance with the first exemplary embodiment, the administrator refers to a user who has the right to access the function used to maintain or control the image forming apparatus 32. In accordance with the first exemplary embodiment, the administrator has the right to access all the functions of the image forming apparatus 32. In other words, the users other than the administrator are able to access a function that is permitted on an individual basis. Referring to FIG. 1, the image forming apparatus 32, file server 33, and terminal 34 are interconnected to each other via the local-area network 31.

Referring to FIG. 1, the file server 33 is present over the local-area network 31 as the image forming apparatus 32. Alternatively, the file server 33 may be present over the Internet or a cloud network. In accordance with the first exemplary embodiment, the file server 33 is set up as a transmission destination of the fax document in the image forming apparatus 32. A specific folder set up in the file server 33 may serve as a transmission destination.

The transmission destination of the fax document may be the terminal 34. If the terminal 34 is set up as a transmission destination, a specific folder or mail address stored in a storage region managed by the terminal 34 may be specified as the transmission destination.

Figure 2:
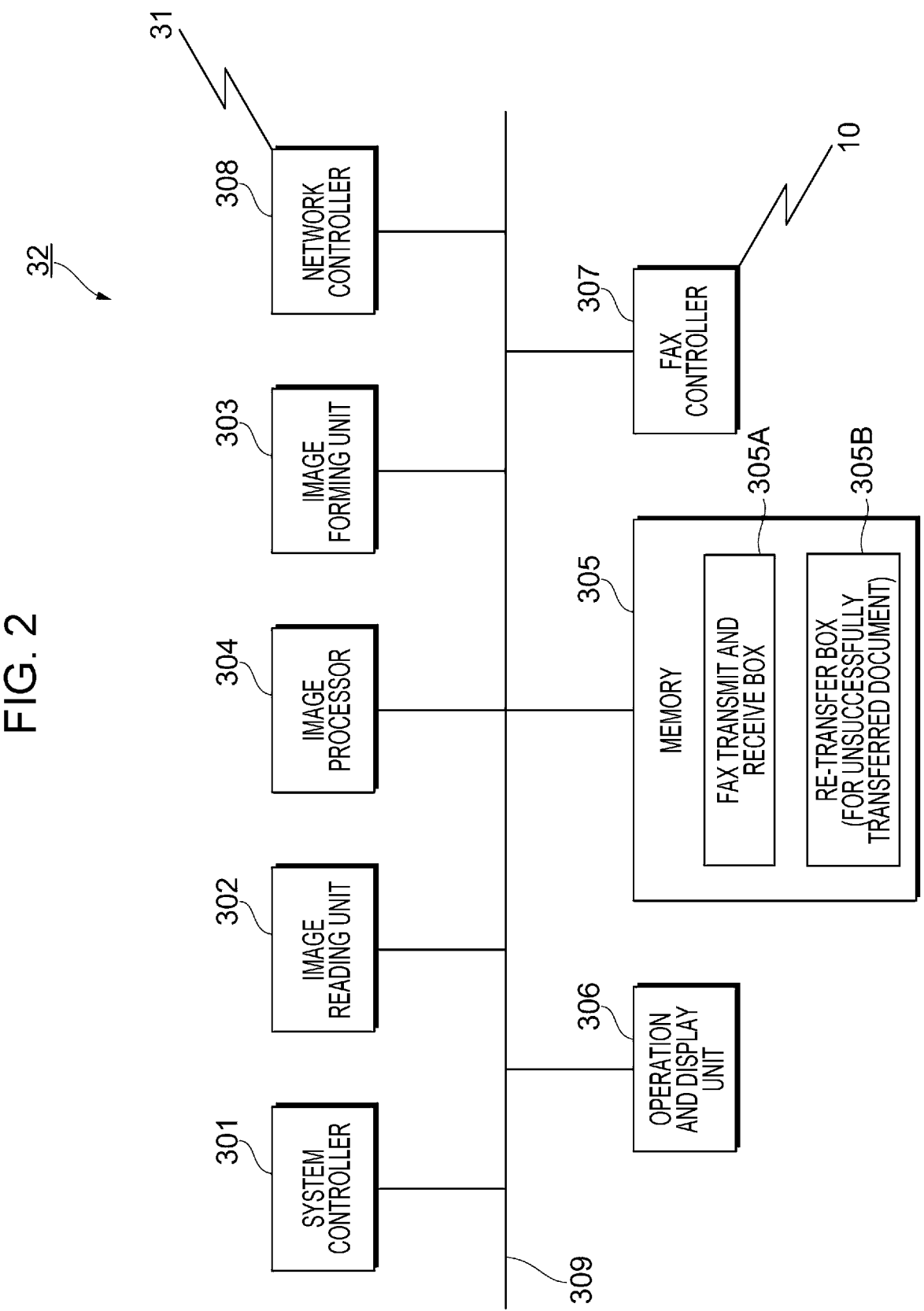
FIG. 2 illustrates the configuration of an image forming apparatus used in the first exemplary embodiment.

FIG. 2 illustrates the configuration of the image forming apparatus 32 used in the first exemplary embodiment. The image forming apparatus 32 in FIG. 2 includes a system controller 301, image reading unit 302, image forming unit 303, image processor 304, memory 305, operation and display unit 306, fax controller 307, and network controller 308. The system controller 301 controls the entire system. The image reading unit 302 reads an image of an original document. The image forming unit 303 forms an image on a paper sheet serving as an example of a recording medium. The image processor 304 performs operations, including color correction and gray level correction, on an image represented by image data. The memory 305 stores the image data and the like. The operation and display unit 306 is used to receive an operation performed by a user or to display information. The fax controller 307 controls fax communication. The network controller 308 controls network communications.

Specifically, the image forming apparatus 32 of the first exemplary embodiment has multiple functions, including a function of reading the image of the original document, a function of forming an image on a paper sheet, and a function of controlling the fax communications. The image forming apparatus 32 of the first exemplary embodiment is an example of an information processing apparatus. The elements included in the image forming apparatus 32 are interconnected to each other via a bus 309 and signal lines (not illustrated).

The system controller 301 includes a central processing unit (CPU), read-only memory (ROM) storing firmware or basic input output system (BIOS), and random-access memory (RAM) serving as a working area. The system controller 301 is a computer and provides a variety of functions by executing a computer program.

The system controller 301 of the first exemplary embodiment provides a function of managing the transfer of a transmitted or received fax document to the file server 33 (see FIG. 1). The system controller 301 is an example of a management unit.

The image reading unit 302 also referred to as a scanner reads the original document for copying or fax transmission. The image forming apparatus 32 of the first exemplary embodiment also includes a device that automatically transports the original document.

The image forming unit 303 forms an image on a paper sheet as an example of a recording medium via electrophotographic system or ink-jet system. The image forming unit 303 includes a device that transports paper sheets.

The image processor 304 includes a dedicated processor or processing circuit that processes image data into data appropriate for printing.

The memory 305 is a non-volatile memory and includes a hard disk device or the like. The memory 305 stores image data corresponding to an image of an original document read by the image reading unit 302, image data provided via a network communication, a fax document transmitted or received via a fax communication, and the like.

The fax data transmitted or received is stored in a dedicated region reserved in the memory 305. In accordance with the first exemplary embodiment, the dedicated region is a fax transmit and receive box 305A. The fax transmit and receive box 305A has been continuously reserved since the shipping phase of the image forming apparatus 32. In other words, the fax transmit and receive box 305A is a fixed region and copying, deleting, and/or modifying the fax transmit and receive box 305A is inhibited.

The fax transmit and receive box 305A is used to temporarily store the transmitted or received fax document until the fax document is transferred to the file server 33. The user is not permitted to perform an operation on the fax document stored in the fax transmit and receive box 305A. In other words, the fax transmit and receive box 305A permits only the system controller 301 to access thereto.

The fax document successfully transferred to the file server 33 is automatically deleted from the fax transmit and receive box 305A under the control of the system controller 301. The fax transmit and receive box 305A is an example of a first region.

The memory 305 of the first exemplary embodiment includes a dedicated region that stores the fax document if the transfer of the fax document to the file server 33 fails. In accordance with the first exemplary embodiment, the dedicated region is a re-transfer box 305B. The re-transfer box 305B has also been reserved since the shipping phase. In other words, the re-transfer box 305B has been present since an initial state of the image forming apparatus 32. The re-transfer box 305B is also a fixed region and copying, deleting, and/or modifying the re-transfer box 305B is inhibited.

The re-transfer box 305B is used to store the fax document that has been unsuccessfully transferred from the fax transmit and receive box 305A to the file server 33. In other words, the re-transfer box 305B is used as a movement destination to which the fax document that has been unsuccessfully transferred to the file server 33 or the like is moved. After the fax document is moved to the re-transfer box 305B, the original fax document is deleted from the fax transmit and receive box 305A.

In accordance with the first exemplary embodiment, the user is permitted to reference or perform an operation on the fax document stored in the re-transfer box 305B. The user may thus reference or perform an operation on the fax document stored in the re-transfer box 305B.

In accordance with the first exemplary embodiment, the file name and attribute of the fax document stored in the re-transfer box 305B are displayed on an operation screen of the terminal 34 (see FIG. 1) that the user is permitted to reference. The attribute includes information on a fax number of a fax destination or a fax sender, time of transmission or reception, and results of the transmission or reception.

The user who is permitted to perform the operation may view the contents of a file displayed on the operation screen, modify the file name, and print, transfer, move, retrieve, and/or delete the file.

In accordance with the first exemplary embodiment, the reference and the operation performed by the user are subject to the restriction that depends on the right of the user.

For example, the user who has transmitted the fax document is permitted to reference or perform the operation on the fax document transmitted by the user but is not permitted to reference or perform the operation on a fax document transmitted by another user. The user having transmitted the fax document is an example of an owner of the fax document.

If a received fax document is optical-character recognition (OCR) processed and a user or a division serving as a destination is identified, only the user or a user who belongs to the division is permitted to reference or perform the operation on the received fax document. The user serving as the fax destination is an example of an owner of the fax document.

Even if the user who has transmitted or the user serving as the destination is not identified, the administrator is permitted to reference or perform the operation on the fax document. In other words, the administrator is permitted to reference or perform the operation on the fax document having no owner. It is noted that the administrator is permitted to reference or perform the operation on all the fax documents.

The right to reference the fax document and the right to perform the operation on the fax document may be separately set up. For example, the user may be permitted to reference the fax document but not permitted to perform the operation on the fax document. Alternatively, the user may not be permitted to reference the fax document but permitted to perform the operation on the fax document.

These settings may be defined as a rule for managing the re-transfer box 305B. The managing rule is managed separately from the fax transmit and receive box 305A. The managing rule may be modified at any time.

The managing rule may include a rule related to re-transfer. The rule related to the re-transfer relates to providing a transmission destination of the fax document that is to be re-transferred from the re-transfer box 305B, a timing of the re-transfer, and a file name used in the re-transfer.

The rule related to the re-transfer may be defined separately from the rule of managing the reference and operation of the fax document stored in the re-transfer box 305B.

If the fax document has been successfully transferred to the file server 33, the original fax document is automatically deleted from the re-transfer box 305B under the control by the system controller 301. The re-transfer box 305B is an example of a second region.

The operation and display unit 306 includes switches and buttons arranged on an operation panel, a liquid-crystal display or an electroluminescence (EL) display used to display information, and a touch sensor that senses an operation of a user on a soft key displayed on the display.

The fax controller 307 controls a transmission job, reception job, and saving of a log including execution results of the jobs.

The network controller 308 controls communications with the file server 33 (see FIG. 1) and the terminal 34 (see FIG. 1) performed via the local-area network 31 (see FIG. 1).

Figure 3:
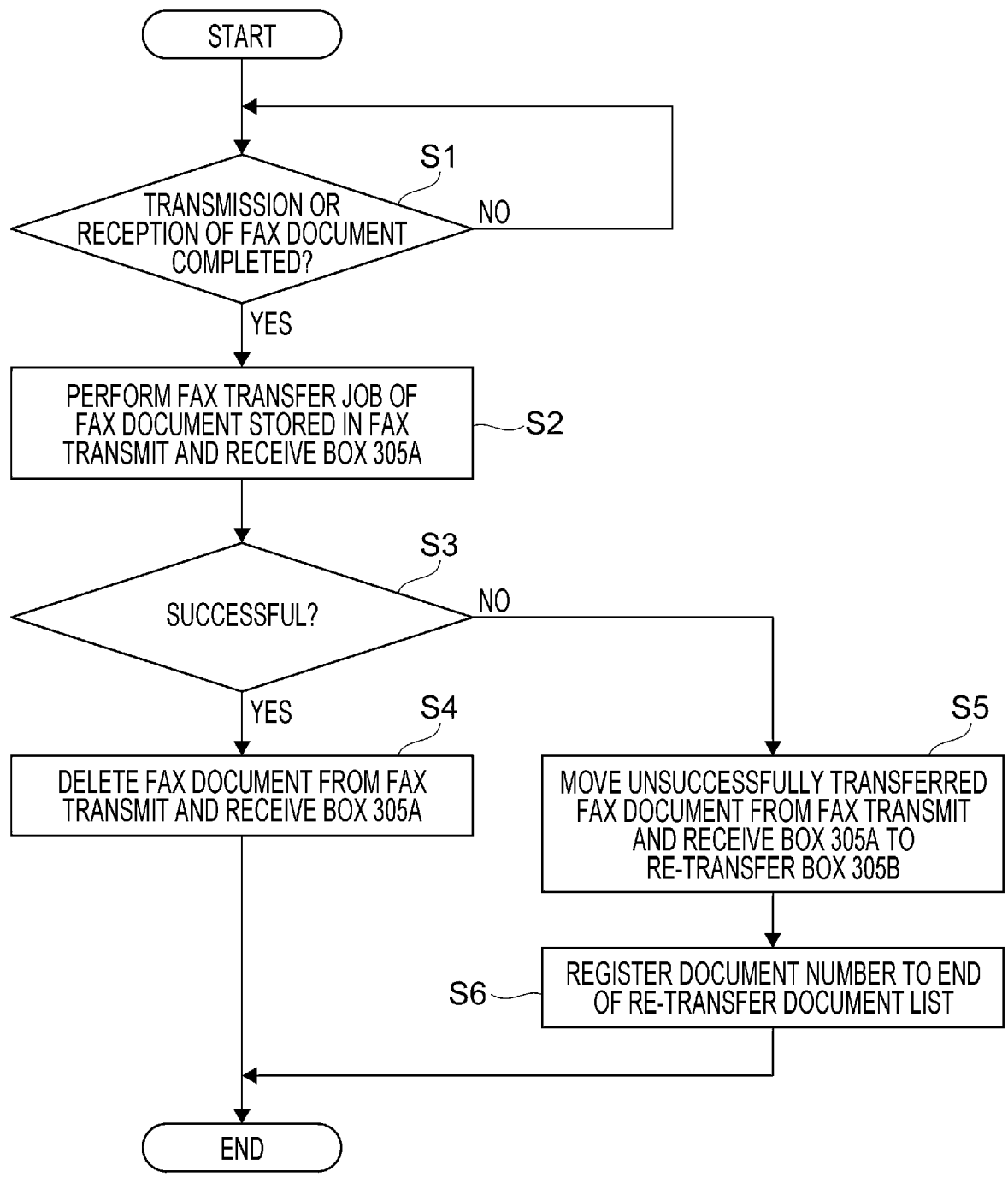
FIG. 3 is a flowchart illustrating an example of a process that the image forming apparatus performs to transmit or receive a fax document.

FIG. 3 is a flowchart illustrating a process performed when the image forming apparatus 32 (see FIG. 1) transmits or receives the fax document. The system controller 301 (see FIG. 2) performs the process illustrated in FIG. 3 by executing the computer program. In FIG. 3, the letter S denotes step.

The system controller 301 determines whether the transmission or reception of a fax document is complete (step S1). While no path is repeated in step S1, the system controller 301 repeats the determination in step S1. The fax document that has been transmitted or received is temporarily stored in the fax transmit and receive box 305A.

If yes path is followed in step S1, the system controller 301 performs a transfer job of the fax document stored in the fax transmit and receive box 305A (step S2). Specifically, the system controller 301 attempts to transfer the fax document to the file server 33 (see FIG. 1) that is set as a transmission destination.

The system controller 301 determines whether the transfer has been successful (step S3). If yes path is followed in step S3, the system controller 301 deletes the fax document from the fax transmit and receive box 305A (step S4). The process thus ends.

If no path is followed in step S3, the system controller 301 moves the fax unsuccessfully transferred document from the fax transmit and receive box 305A to the re-transfer box 305B (step S5). Since this operation is movement, the original fax document is deleted from the fax transmit and receive box 305A.

The system controller 301 registers a document number of the transfer job at the end of a re-transfer document list (step S6). For example, the re-transfer document list is stored in the memory 305.

A document number identifies each document corresponding thereto and is assigned at each transfer job. The document number is an example of information managing the document. The document number is managed by the image forming apparatus 32 (see FIG. 1).

The re-transfer document list lists document numbers that manage fax documents that have been unsuccessfully transferred to the file server 33 (see FIG. 1). The re-transfer operation is performed starting with the top of the re-transfer document list.

Figure 4A:
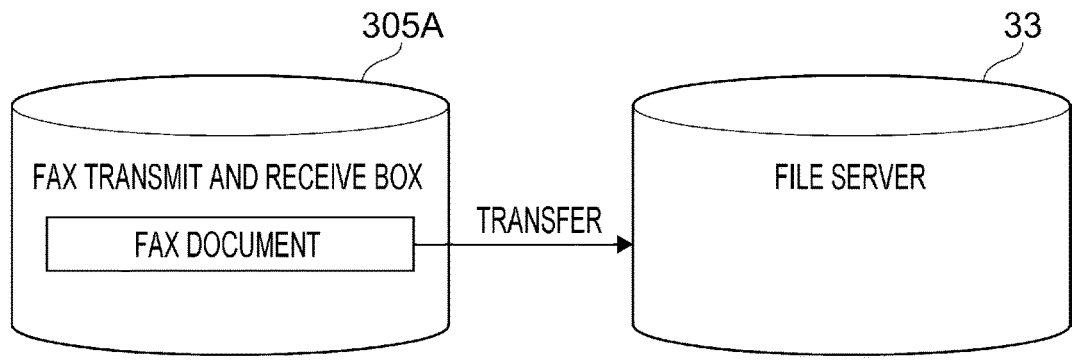
Figure 4B:
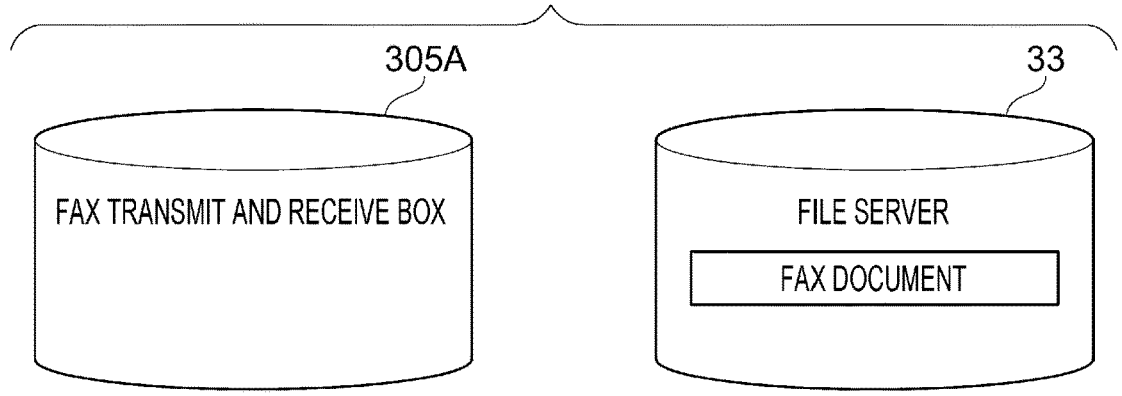
Figure 4C:
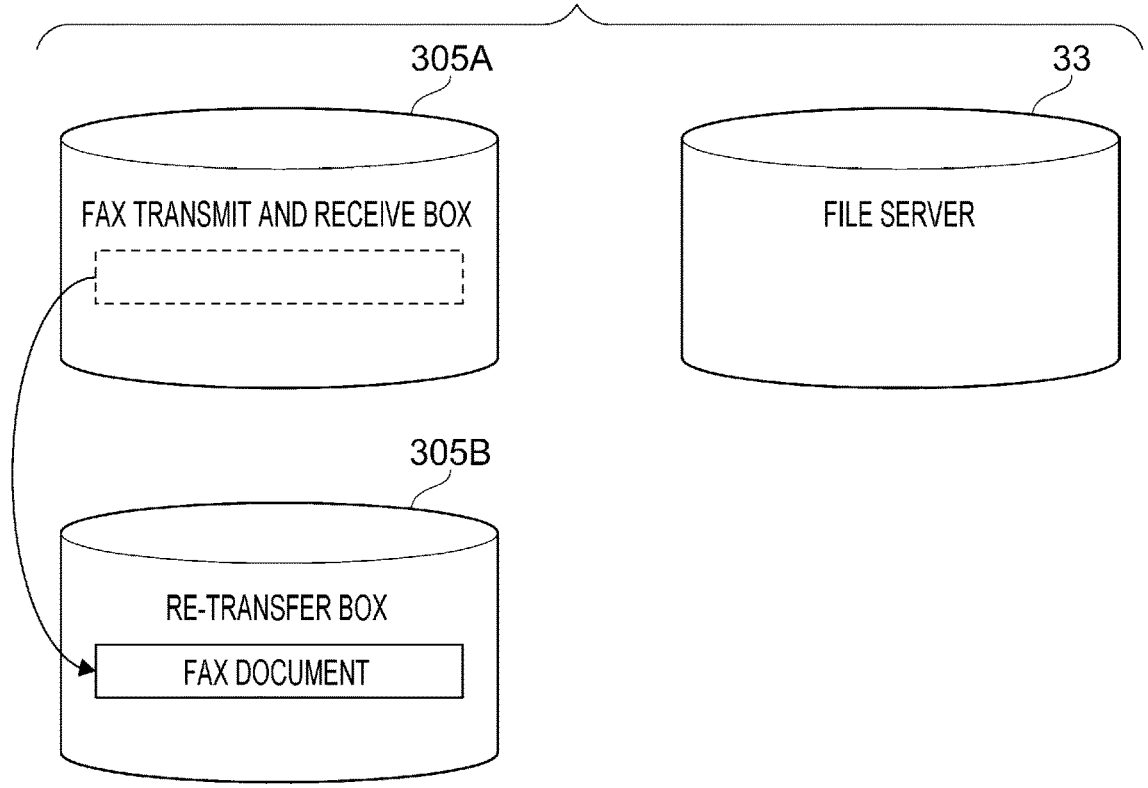
FIG. 4C illustrates an unsuccessful fax transfer.

FIGS. 4A through 4C illustrate the transfer of the fax documents. FIG. 4A illustrates the transfer of the fax document that has been transmitted or received. FIG. 4B illustrates the transfer that has been successfully completed. FIG. 4C illustrates the transfer that has been unsuccessfully completed.

As described above, when the transmission or reception of the fax document is complete, the transfer job to transfer the fax document to the file server 33 is performed as illustrated in FIG. 4A. If the local-area network 31 (see FIG. 1) is not malfunctioning, the fax document is transferred to the file server 33 as illustrated in FIG. 4B. If the transfer of the fax document is successful, the original fax document is deleted from the fax transmit and receive box 305A.

If the transfer of the fax document is unsuccessful, the fax document is moved to the re-transfer box 305B as illustrated in FIG. 4C. Since this is a movement operation, the corresponding fax document is deleted from the fax transmit and receive box 305A.

In accordance with the first exemplary embodiment, the fax documents that have been unsuccessfully transferred, namely, all the fax documents waiting to be re-transferred are moved from the fax transmit and receive box 305A to the re-transfer box 305B. The fax documents waiting to be re-transferred are not continuously accumulated on the fax transmit and receive box 305A. In other words, an increase in the amount of fax documents waiting to be re-transferred does not lead to a decrease in the available capacity of the fax transmit and receive box 305A.

If only the fax transmit and receive box 305A is used, the fax transmit and receive box 305A is accessed to transmit or receive the fax document, to transfer the fax document, and to re-transfer the fax document. The fax transmit and receive box 305A is thus busy. In such a case, access contention is likely, leading to a decrease in performance of transmission and reception of the fax document. If the fax document waiting to be re-transferred is moved to the re-transfer box 305B, access contention is hard to occur and a decrease in performance of transmission and reception of the fax document is less likely.

Only the fax transmit and receive box 305A is used and the fax document waiting to be re-transferred may happen to be missing from the fax transmit and receive box 305A. In accordance with the first exemplary embodiment, the use of the re-transfer box 305B allows the fax document waiting to be re-transferred to be stored until the re-transfer operation is successfully performed.

The re-transfer box 305B of the first exemplary embodiment is a region which the user may reference or perform an operation to. In the same way as in the case where fax documents are accumulated in the file server 33 (see FIG. 1), the user may use the terminal 34 (see FIG. 1) to reference or perform an operation on the fax document that is unsuccessfully transferred and waiting to be re-transferred.

Figure 5:
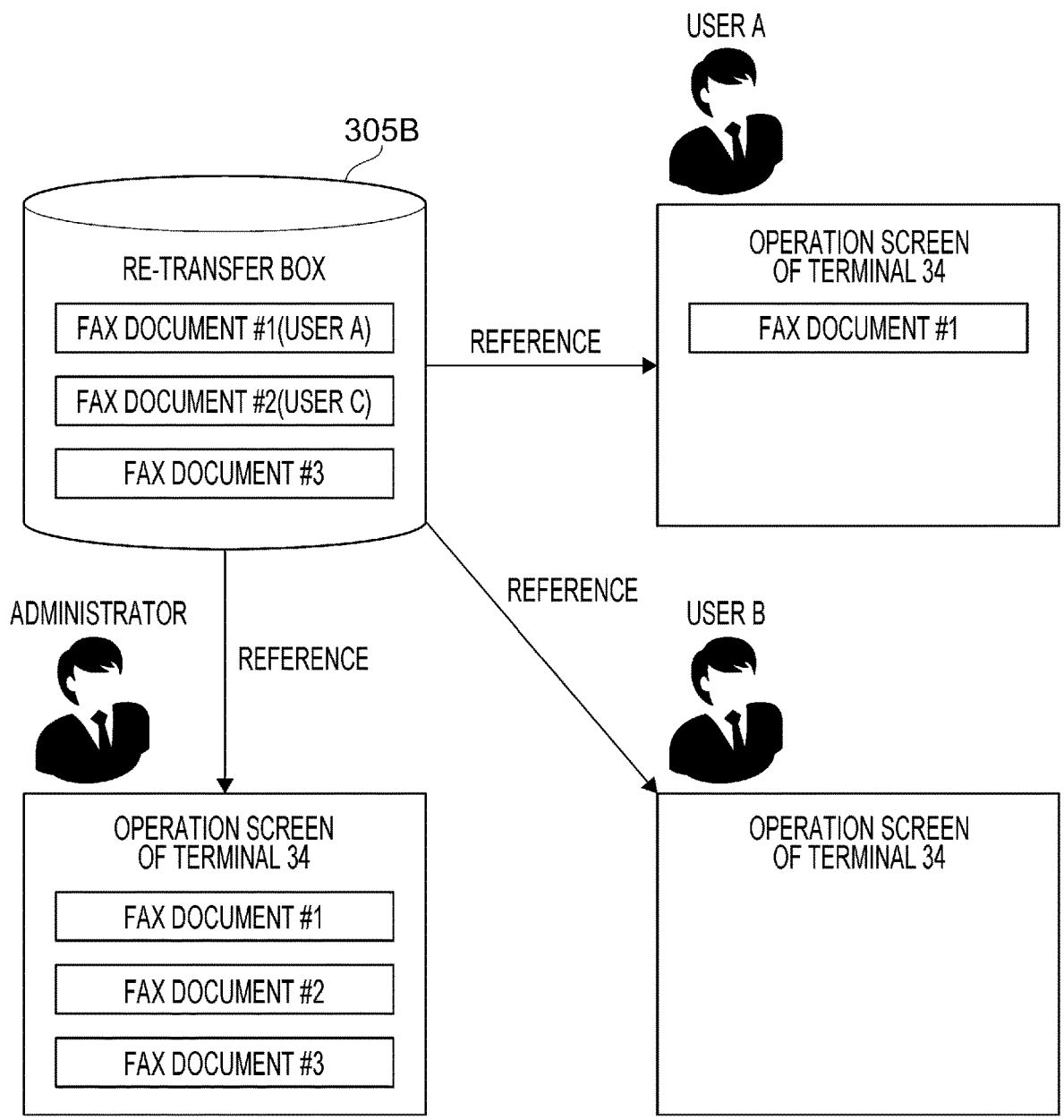
FIG. 5 illustrates an example of an operation screen that is displayed when a terminal references the fax document stored in a re-transfer box.

FIG. 5 illustrates an example of an operation screen that is displayed when the terminal 34 references the fax document stored in the re-transfer box 305B. Referring to FIG. 5, the re-transfer box 305B stores three fax documents #1, #2, and #3. The fax document #1 is owned by user A, the fax document #2 is owned by user C, and the fax document #3 is owned by an unknown user.

The user A may now reference the re-transfer box 305B using the terminal 34. In such a case, only the fax document #1 owned by the user A is displayed on the operation screen of the terminal 34 operated by the user A. If the user C references the re-transfer box 305B, only the fax document #2 is displayed on the operation screen.

The fax document owned by user B is not stored in the re-transfer box 305B. Even if the user B references the re-transfer box 305B, nothing is displayed on the operation screen of the terminal 34 of the user B.

All the fax documents #1, #2, and #3 stored in the re-transfer box 305B are displayed on the operation screen of the terminal 34 operated by the administrator.

The same is true of the above operation if each of the image forming apparatus 32 (see FIG. 2) and the operation and display unit 306 (see FIG. 2) is operated by the user A, the user B, or the administrator. However, this is based on the premise that each person who operates the image forming apparatus 32 is authenticated through an authentication function.

Figure 6:
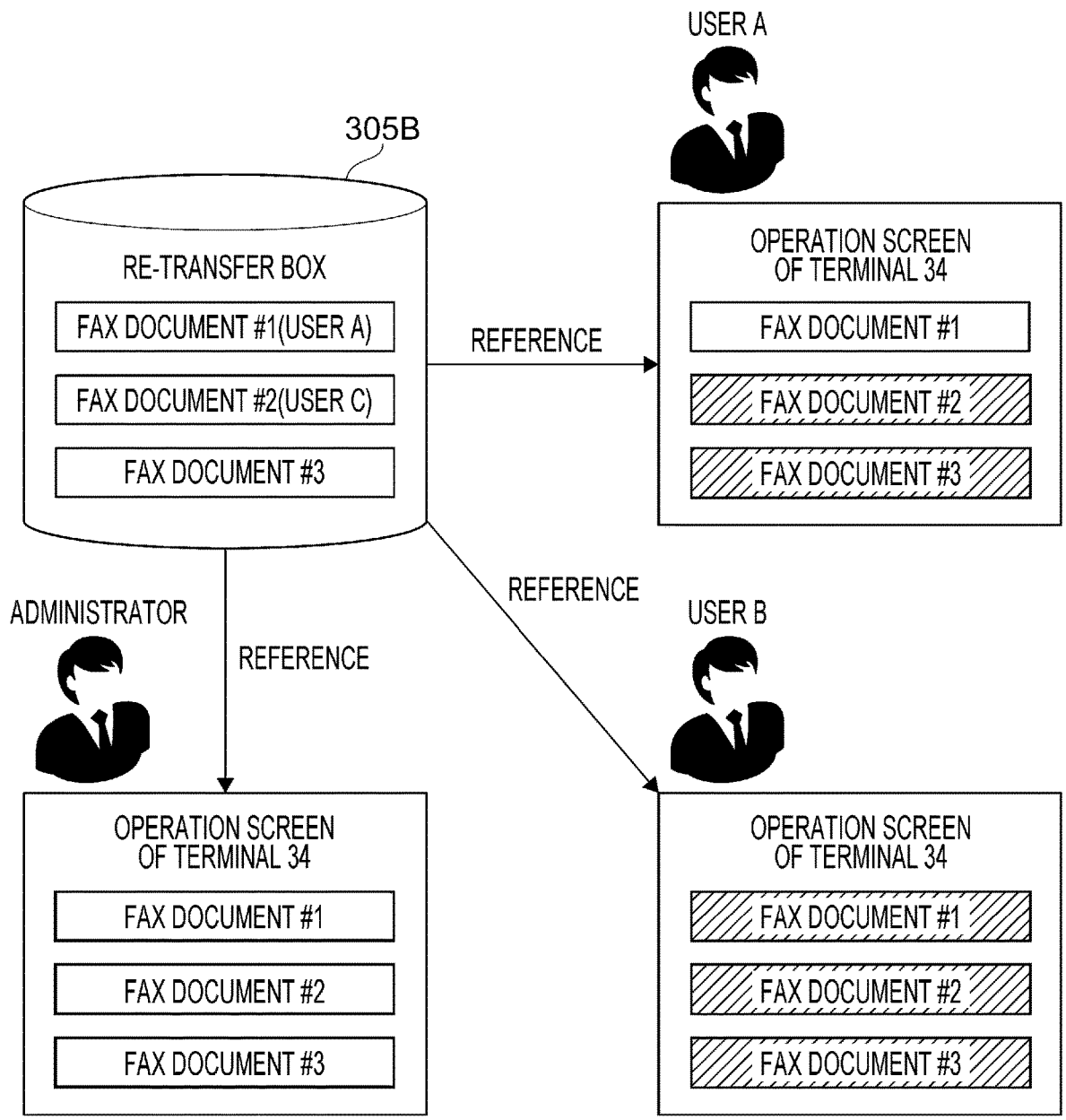
FIG. 6 illustrates another example of an operation screen that is displayed when the terminal references the fax document stored in the re-transfer box.

FIG. 6 illustrates another example of an operation screen that is displayed when the terminal 34 references the fax document stored in the re-transfer box 305B. In FIG. 6, elements identical to those in FIG. 5 are designated with the same reference numerals.

Referring to FIG. 6, any user may confirm the presence of the fax document stored in the re-transfer box 305B. Specifically, the fax documents #1, #2, and #3 present in the re-transfer box 305B are displayed on the operation screen of the terminal 34 operated by the user A and the operation screen of the terminal 34 operated by the user B.

The user is permitted to perform an operation on any of the fax documents #1, #2, and #3 if that fax document is owned by the user.

Only the fax document #1 is displayed in an accessible manner on the operation screen of the terminal 34 operated by the user A, and the fax documents #2 and #3 are displayed in an inaccessible manner on the operation screen of the terminal 34 operated by the user A. FIG. 6 illustrates an accessible fax document in white background and inaccessible fax documents in hatched area.

All the fax documents #1, #2, and #3 are displayed in hatched areas on the operation screen of the terminal 34 operated by the user B.

All the fax documents #1, #2, and #3 are displayed with white background on the operation screen of the terminal 34 operated by the administrator having administrator right.

The user who has the right to perform an operation on a fax document is only the owner of that fax document. The contents of the fax document waiting to be re-transferred are not viewed by a user having no right.

Figure 7:
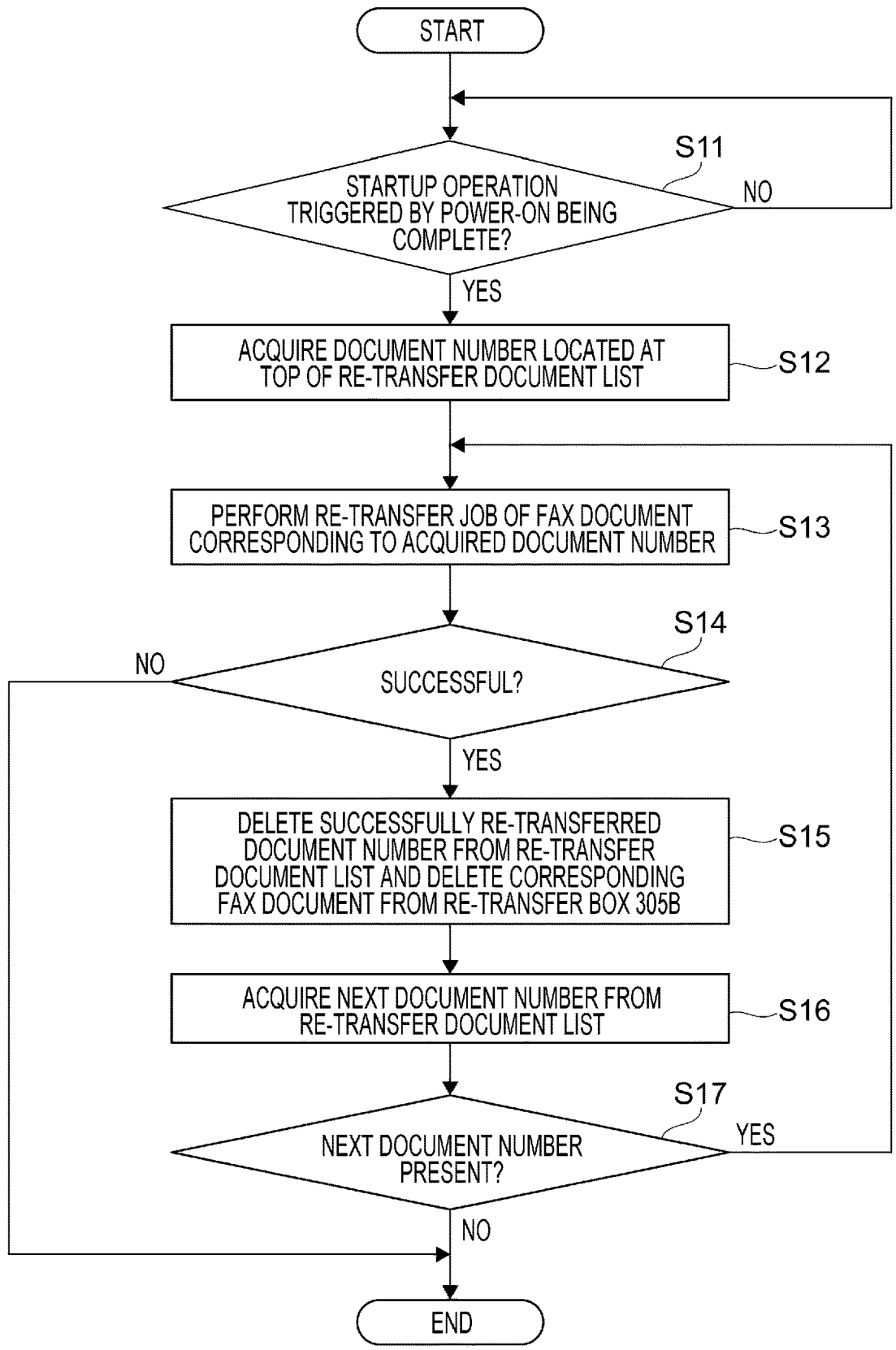
FIG. 7 is a flowchart illustrating an example of a re-transfer process performed by the image forming apparatus.

FIG. 7 is a flowchart illustrating an example of a re-transfer process performed by the image forming apparatus 32 (see FIG. 1).

The process in FIG. 7 is performed when the system controller 301 (see FIG. 2) executes the computer program. The letter S in FIG. 7 denotes step.

As previously described, the rules related to the re-transfer are set up for the re-transfer box 305B and one of the rules defines the timing of the re-transfer. In accordance with the first exemplary embodiment, defined as the timings of the re-transfer are startup time of the image forming apparatus 32 (see FIG. 1), predetermined time and date, time of setting network connection and time of modifying the network connection. FIG. 7 illustrates the process performed at the startup time of the image forming apparatus 32 as one of the timings of the re-transfer.

The system controller 301 determines whether a startup operation triggered by power-on is complete (step S11). While no path is repeatedly followed in step S11, the system controller 301 repeats the determination.

If yes path is followed in step S11, the system controller 301 acquires the document number at the top of the re-transfer document list (step S12).

The system controller 301 performs the re-transfer job of the fax document corresponding to the acquired document number (step S13).

The system controller 301 determines whether the re-transfer has been successfully completed (step S14).

If no path is followed in step S14, the system controller 301 completes the current re-transfer job. This is because the cause for the re-transfer failure is common to other fax documents waiting to be re-transferred. In such a case, the contents of the re-transfer document list are maintained until the next timing of re-transfer.

If yes path is followed in step S14, the system controller 301 deletes from the re-transfer document list the document number of a fax document that has been successfully re-transferred and deletes the fax document from the re-transfer box 305B (step S15).

The system controller 301 acquires the next document number from the re-transfer document list (step S16).

The system controller 301 then determines whether the next document number is available (step S17).

If yes path is followed in step S17, the system controller 301 returns to step S13 and re-transfers the fax document corresponding to the newly acquired document number. If no path is followed in step S17, the system controller 301 ends the re-transfer process.

Figure 8A:
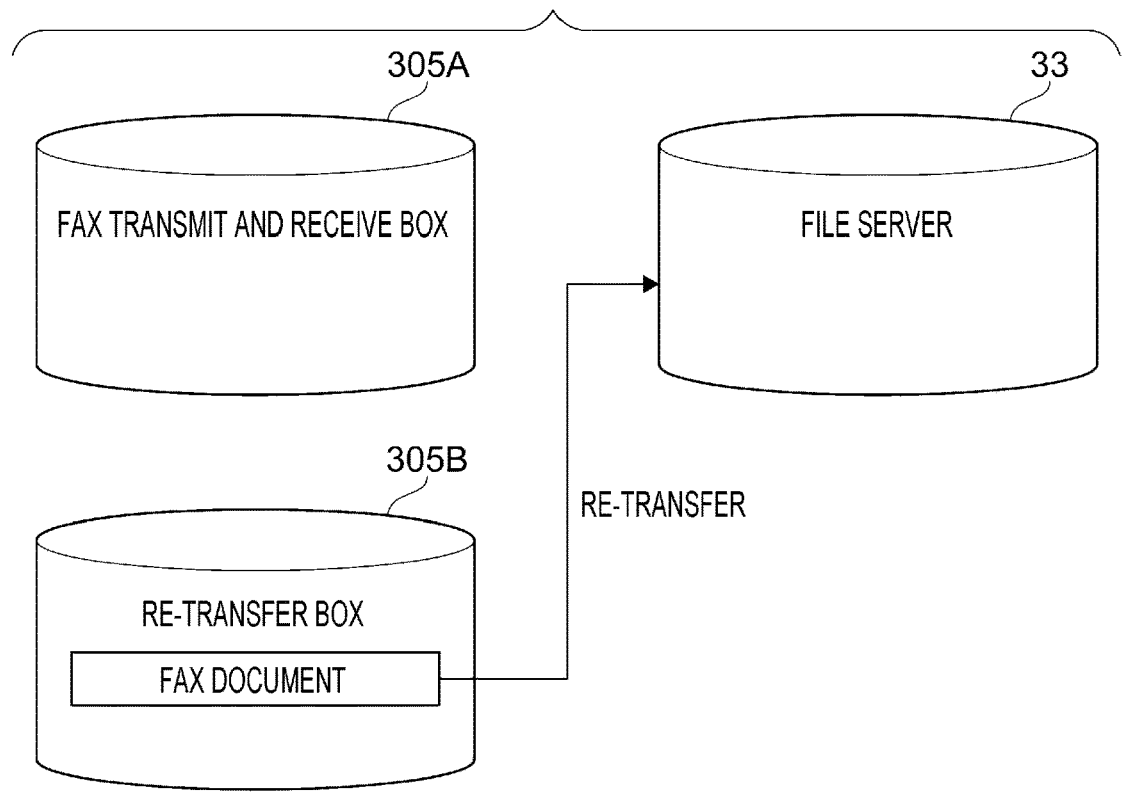
Figure 8B:
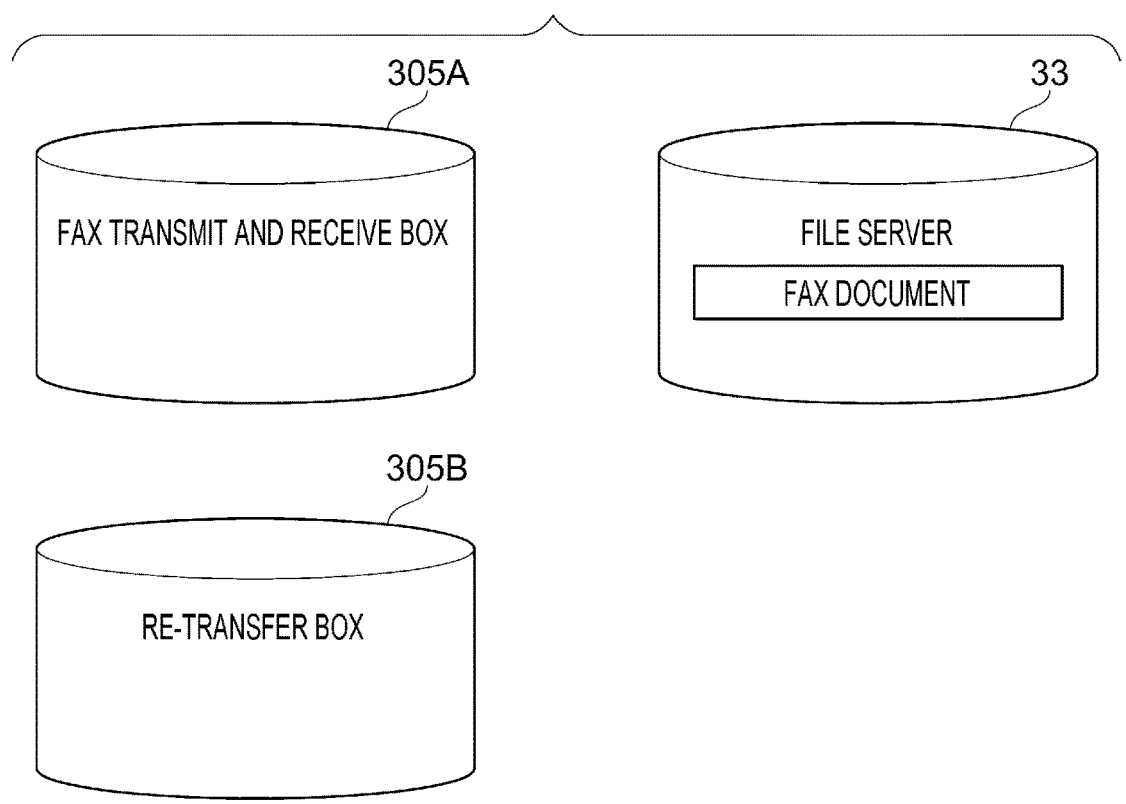

FIGS. 8A and 8B illustrate the re-transfer of the fax document. FIG. 8A illustrates the fax document that is re-transferred from the re-transfer box 305B and FIG. 8B illustrates a successful re-transfer.

Referring to FIGS. 8A and 8B, In accordance with the first exemplary embodiment, if the fax document has been unsuccessfully transferred from the fax transmit and receive box 305A, the fax document is then re-transferred from the re-transfer box 305B to the file server 33. Once the fax document is successfully re-transferred, the original fax document is deleted from the re-transfer box 305B. If the re-transfer of the fax document has been unsuccessful, the state illustrated in FIG. 8A is maintained.

As previously described, the rule related to the re-transfer is applied to the re-transfer box 305B and is separately managed from the rule applied to the fax transmit and receive box 305A. An example of the rule related to the re-transfer is described below.

Figure 9A:
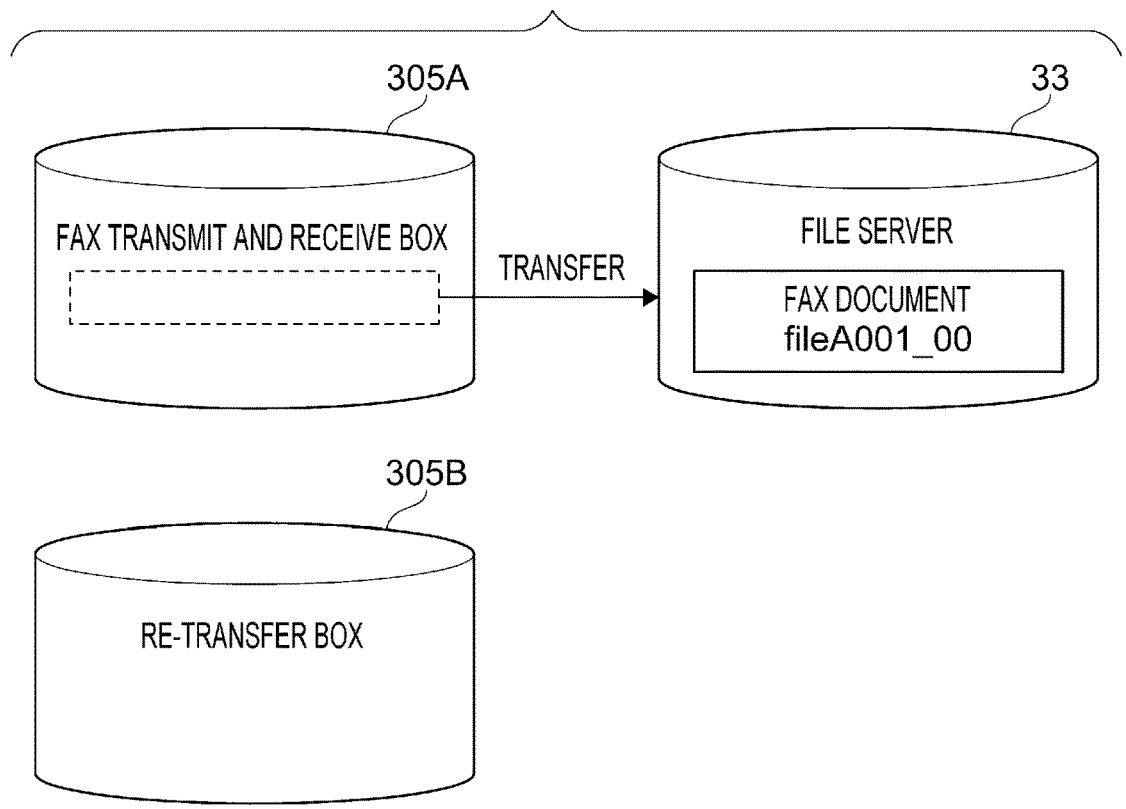
Figure 9B:
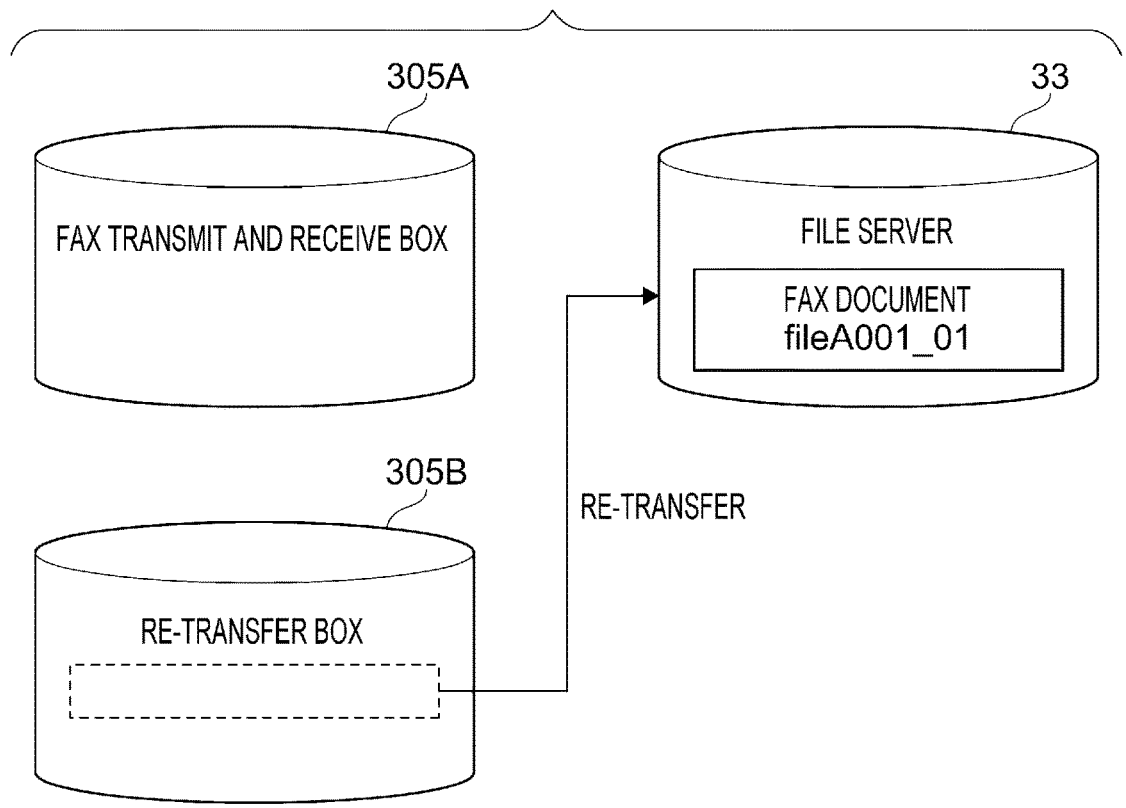

FIGS. 9A and 9B illustrate an operation example in which a file name is different from transfer to re-transfer given the same transfer target. FIG. 9A illustrates the case in which the fax document is transferred from the fax transmit and receive box 305A and FIG. 9B illustrates the case in which the fax document is re-transferred from the re-transfer box 305B.

Referring to FIGS. 9A and 9B, the fax document transferred from the fax transmit and receive box 305A to the file server 33 has a file name having "00" at the end of thereof. On the other hand, the fax document transferred from the re-transfer box 305B to the file server 33 has a file name having "01" at the end thereof.

As a result, by simply viewing the file name of the fax document stored on the file server 33, the user may recognize whether the re-transfer has been performed or not.

Figure 10A:
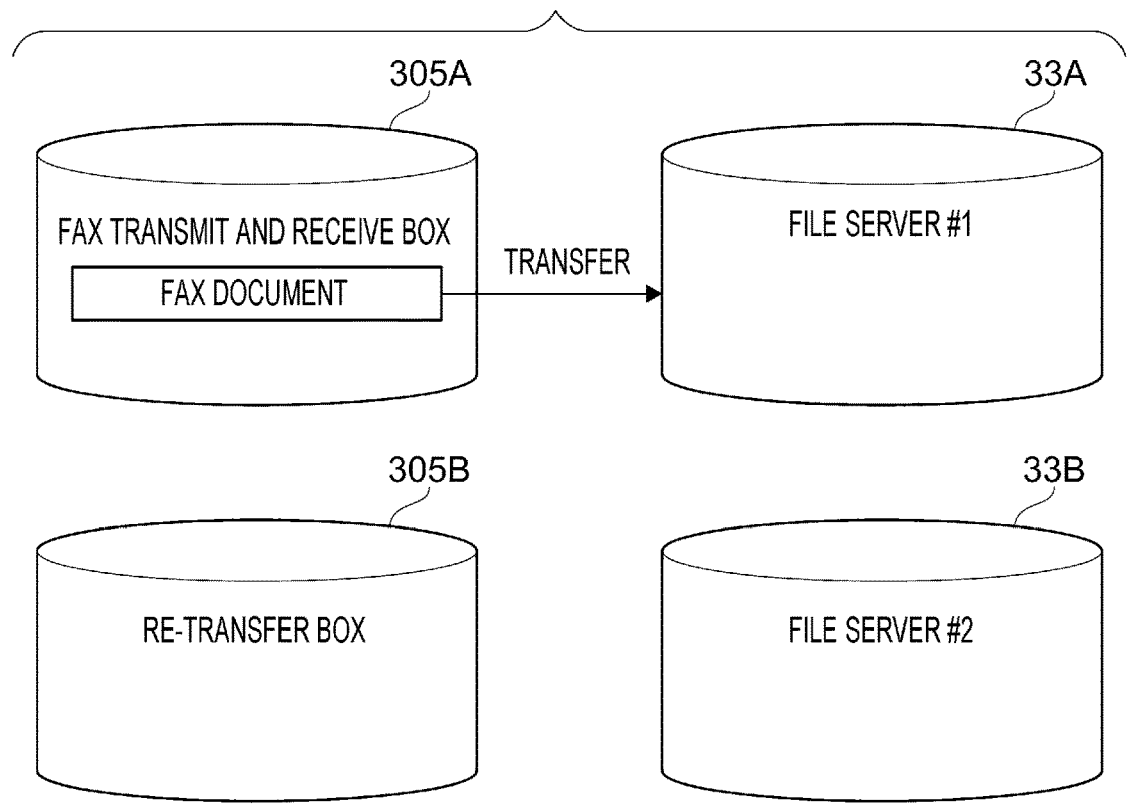
Figure 10B:
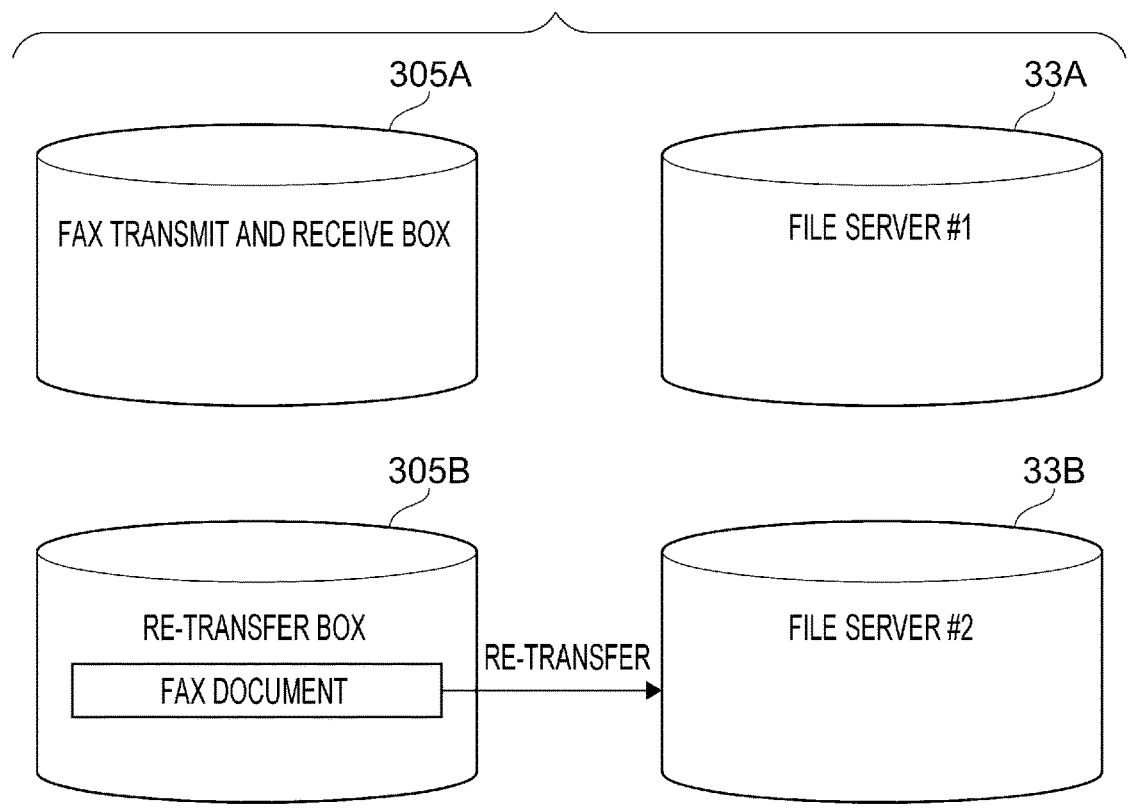

FIGS. 10A and 10B illustrate an operation example in which a storage region is different from transfer to re-transfer given the same transfer target. FIG. 10A illustrates the case in which the fax document is transferred from the fax transmit and receive box 305A and FIG. 10B illustrates the case in which the fax document is re-transferred from the re-transfer box 305B.

Referring to FIGS. 10A and 10B, the transmission destination from the fax transmit and receive box 305A is a file server 33A while the transmission destination from the re-transfer box 305B is a file server 33B. The file server 33A and the file server 33B may be physically different servers or different folders arranged in the same server.

By differentiating the transmission destinations, a fax document that has been successfully transferred at a first transfer may be managed separately from a fax document that has been re-transferred after the first transfer that is unsuccessful.

Other Exemplary Embodiments

In accordance with the first exemplary embodiment, all the unsuccessfully transferred fax documents are moved to the re-transfer box 305B. A fax document that satisfies a predetermined movement condition may be moved to the re-transfer box 305B.

Figure 11:
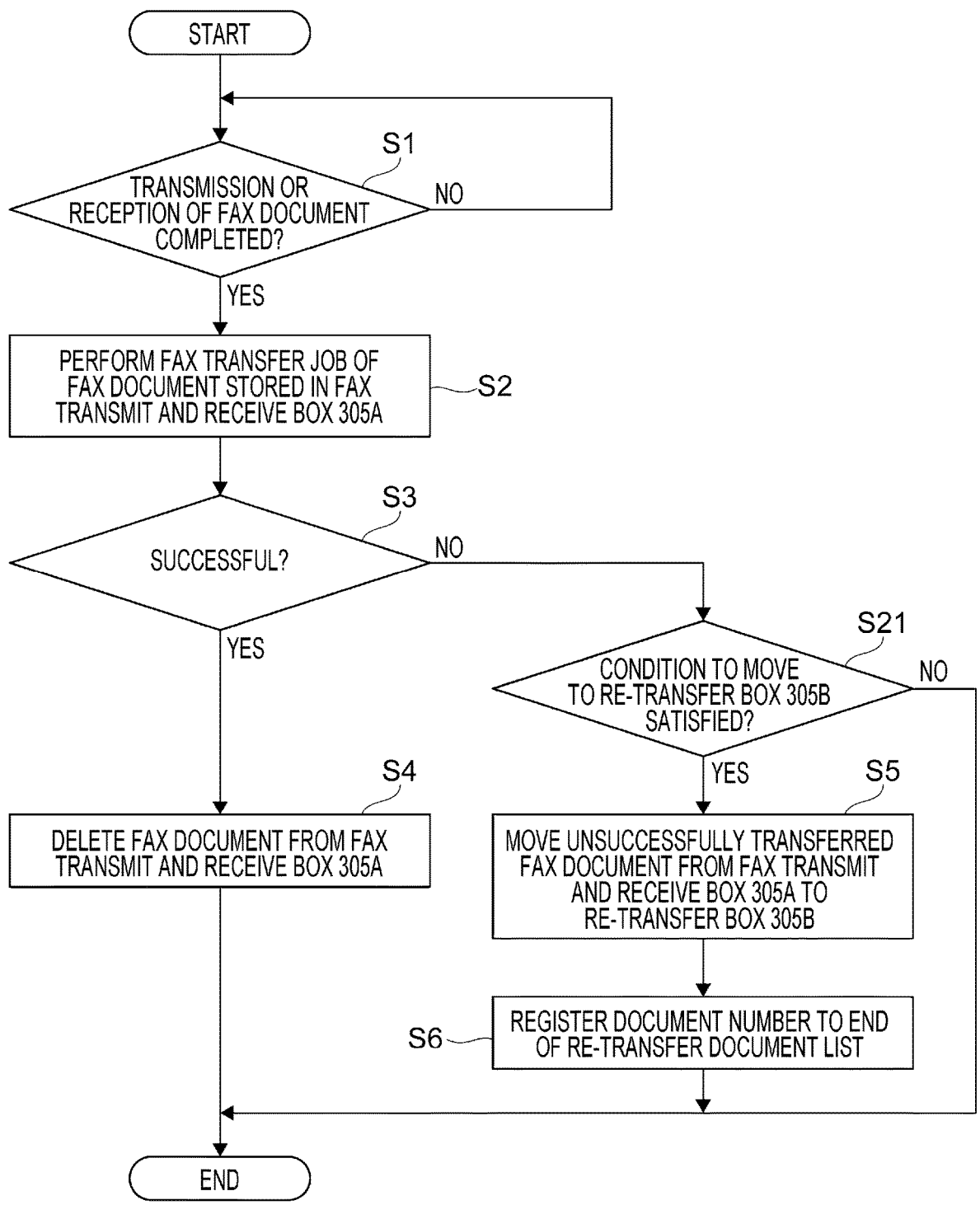
FIG. 11 is a flowchart illustrating a process performed when the image forming apparatus transmits or receives the fax document.

FIG. 11 is a flow chart illustrating a process performed when the image forming apparatus 32 (see FIG. 1) transmits or receives the fax document. In FIG. 11, elements identical to those in FIG. 3 are designated with the same reference numerals.

Referring to FIG. 11, if no path is followed in step S3, processing proceeds to step S21 that determines whether the movement condition to move to the re-transfer box 305B is satisfied. The movement condition is set up beforehand as a rule for the management of the fax transmit and receive box 305A.

If the movement condition is satisfied, the system controller 301 (see FIG. 2) proceeds to step S5. If the movement condition is not satisfied, the system controller 301 ends the process.

FIG. 12 illustrates an example of movement conditions. FIG. 12 lists six conditions. Condition 1 is that the cause for a transfer failure is due to a network fault. If the cause for the transfer failure is due to a network fault, it is likely to take time to restore the network from the fault. If it takes time to restore the network, the number of fax documents accumulated in the fax transmit and receive box 305A increases. As previously described, the fax document stored in the fax transmit and receive box 305A may go unnoticed and may go missing because of insufficient memory capacity. If the cause for the transfer failure is due to a network fault, the fax document is moved to the re-transfer box 305B with a higher priority such that the fax document does not go missing.

Condition 2 is that the fax document corresponds to a pre-registered sender or a specific transmission source. If the sender or the transmission destination is a customer or a division in the customer, the fax document may be of importance. If the fax document corresponds to a pre-registered sender or a specific transmission source, the fax document is moved to the re-transfer box 305B with a higher priority such that the fax document does not go missing. Information on the sender or the transmission destination may be acquired through an optical character recognition (OCR) process performed on the fax document.

Condition 3 is that a predetermined term is found in the fax document. The predetermined term may indicate importance, secret, urgency, and/or risk and may include a specific noun or name. The fax document including such term may have a high degree of necessity for storage. If the predetermined term is detected in the fax document, the fax document is moved to the re-transfer box 305B with a higher priority such that the fax document does not go missing. A determination as to whether the predetermined term is found in the fax document is made by using the results of the OCR process on the fax document.

Condition 4 is that an amount of data of the fax document is equal to or below a predetermined size. A storage capacity assigned to the re-transfer box 305B is subject to a limit. If the fax document of a higher amount of data is moved to the re-transfer box 305B, the movement of a fax document that is to moved with a higher priority may be difficult. A fax document having a predetermined data size or below is moved to the re-transfer box 305B with a higher priority such that the fax document does not go missing.

Condition 5 is a predetermined time period. A fax document may be received during a time period through which nobody attends, such as during nighttime. Even if a fax document that has been unsuccessfully transferred is not moved to the re-transfer box 305B, no problem is presented in business operation. A time period during which users are working is set up beforehand such that the fax document is moved to the re-transfer box 305B with a higher priority. Even if a fax document is received during a time period through which nobody attends, such as during nighttime, that fax document is moved to the re-transfer box 305B during a time period through which users are working.

Condition 6 is that the owner of the fax document is a specific user who has been registered beforehand. As previously described, the owner of the fax document includes a user who has transmitted the fax document or a user as a destination of the fax document. If whether to move a fax document to the re-transfer box 305B is set up on each user, the fax document of importance may be moved to the re-transfer box 305B with a higher priority.

A determination as to whether to move the fax document to the re-transfer box 305B may be determined in accordance with the condition that the re-transfer box 305B has an available memory capacity equal to or above a predetermined size. Also, the determination as to whether to move the fax document to the re-transfer box 305B may be determined in accordance with the condition that the re-transfer box 305B has an available memory capacity higher than the size of the data of the fax document to be moved.

In accordance with the first exemplary embodiment, an apparatus having a function of controlling the transfer and re-transfer of the fax document is the image forming apparatus 32 (see FIG. 1) having the fax function. The apparatus having the control function is not limited to the image forming apparatus 32. For example, the apparatus having the control function described in the first exemplary embodiment may be the fax device 20 (see FIG. 1). The fax device 20 is also an example of an information processing apparatus. The apparatus having the control function described in the first exemplary embodiment may be an information processing apparatus, such as a server, controlling or managing the process related to the fax function.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising a processor programmed to:
   delete from a first region a fax document that has been successfully transferred to a predetermined transmission destination; and
   move from the first region to a second region a fax document that has been unsuccessfully transferred to a transmission destination, wherein:
   the first region and the second region are two separate fixed regions in a same hardware memory where copying, deleting, and modifying of the two fixed regions are inhibited,
   the first region is accessible only by a system controller, and a user is not permitted to perform any operation on the fax document stored in the first region, and
   the second region is accessible by the user, and the user is permitted to perform an operation on the fax document stored in the second region.

2. The information processing apparatus according to claim 1, wherein the processor is programmed to
   if the fax document stored in the second region has an owner, limit the user who is permitted to perform the operation to the fax document to a person who is the owner or an administrator.

3. The information processing apparatus according to claim 1, wherein the processor is programmed to
   if the fax document stored in the second region has no owner, limit the user who is permitted to perform the operation on the fax document to an administrator.

4. The information processing apparatus according to claim 2, wherein the processor is programmed to
   if the fax document stored in the second region has no owner, limit the user who is permitted to perform the operation on the fax document to the administrator.

5. The information processing apparatus according to claim 1, wherein the processor is programmed to
   if the fax document stored in the second region has an owner, limit the user who is permitted to reference the fax document to a person who is the owner or an administrator.

6. The information processing apparatus according to claim 5, wherein the processor is programmed to
   if the fax document stored in the second region has no owner, limit the user who is permitted to reference the fax document to the administrator.

7. The information processing apparatus according to claim 1, wherein the processor is programmed to
   if the fax document stored in the second region has no owner, limit the user who is permitted to reference the fax document to an administrator.

8. The information processing apparatus according to claim 1, wherein
   a rule of transfer different from a rule of transfer applicable to the first region is set in the second region.

9. The information processing apparatus according to claim 8, wherein
the transmission destination of the fax document from the second region is set to be different from the transmission destination of the fax document from the first region.

10. The information processing apparatus according to claim 8, wherein
a file name of the fax document transferred from the second region is set to be different from a file name of the fax document transferred from the first region.

11. The information processing apparatus according to claim 1, wherein the processor is programmed to
if a predetermined condition is satisfied, move from the first region to the second region the fax document that has been unsuccessfully transferred to the transmission destination.

12. The information processing apparatus according to claim 11, wherein
the condition is that the fax document has been unsuccessfully transferred because of a network failure.

13. The information processing apparatus according to claim 11, wherein
the condition is that a specific term is detected from the fax document.

14. The information processing apparatus according to claim 11, wherein
the condition is that an owner of the fax document is a specific user.

15. The information processing apparatus according to claim 1, wherein
the second region has been present since an initial state of the information processing apparatus.

16. The information processing apparatus according to claim 1, wherein
an increase in amount of fax documents stored in the second region does not lead to a decrease in available storage capacity in the first region.

17. A non-transitory computer readable medium storing a program causing a computer to execute a process for processing information, the process comprising:
deleting from a first region a fax document that has been successfully transferred to a predetermined transmission destination; and
moving from the first region to a second region a fax document that has been unsuccessfully transferred to a transmission destination, wherein:
the first region and the second region are two separate fixed regions in a same hardware memory where copying, deleting, and modifying of the two fixed regions are inhibited,
the first region is accessible only by a system controller, and a user is not permitted to perform any operation on the fax document stored in the first region, and
the second region is accessible by the user, and the user is permitted to perform an operation on the fax document stored in the second region.

18. An information processing apparatus, comprising
management means for
deleting from a first region a fax document that has been successfully transferred to a predetermined transmission destination; and
moving from the first region to a second region a fax document that has been unsuccessfully transferred to a transmission destination, wherein:
the first region and the second region are two separate fixed regions in a same hardware memory where copying, deleting, and modifying of the two fixed regions are inhibited,
the first region is accessible only by a system controller, and a user is not permitted to perform any operation on the fax document stored in the first region, and
the second region is accessible by the user, and the user is permitted to perform an operation on the fax document stored in the second region.

* * * * *